(12) United States Patent
Oberoi et al.

(10) Patent No.: US 9,133,413 B2
(45) Date of Patent: Sep. 15, 2015

(54) VISCOSITY INDEX IMPROVERS FOR LUBRICATING OIL COMPOSITIONS

(75) Inventors: Sonia Oberoi, Edison, NJ (US); Stuart Briggs, Edison, NJ (US)

(73) Assignee: INFINEUM INTERNATIONAL LIMITED (GB)

( * ) Notice: Subject to any disclaimer, the term of this patent is extended or adjusted under 35 U.S.C. 154(b) by 238 days.

(21) Appl. No.: 13/332,750

(22) Filed: Dec. 21, 2011

(65) Prior Publication Data

US 2013/0165362 A1 Jun. 27, 2013

(51) Int. Cl.

| | |
|---|---|
| *C10M 173/02* | (2006.01) |
| *C10L 1/16* | (2006.01) |
| *C10M 157/00* | (2006.01) |
| *C10M 171/04* | (2006.01) |
| *C08F 8/04* | (2006.01) |
| *C08L 15/00* | (2006.01) |
| *C08C 19/02* | (2006.01) |

(52) U.S. Cl.

CPC ............... *C10M 157/00* (2013.01); *C08F 8/04* (2013.01); *C08L 15/00* (2013.01); *C10M 171/04* (2013.01); *C08C 19/02* (2013.01); *C10M 2203/065* (2013.01); *C10M 2203/1025* (2013.01); *C10M 2205/0285* (2013.01); *C10M 2205/04* (2013.01); *C10M 2205/06* (2013.01); *C10M 2209/084* (2013.01); *C10N 2220/021* (2013.01); *C10N 2220/022* (2013.01); *C10N 2220/027* (2013.01); *C10N 2220/029* (2013.01); *C10N 2220/033* (2013.01); *C10N 2230/02* (2013.01); *C10N 2230/54* (2013.01); *C10N 2230/68* (2013.01); *C10N 2240/04* (2013.01); *C10N 2240/042* (2013.01); *C10N 2240/102* (2013.01); *C10N 2240/103* (2013.01); *C10N 2260/02* (2013.01); *C10N 2270/02* (2013.01)

(58) Field of Classification Search
CPC . C10M 14/10; C10M 143/12; C10M 143/143
USPC .................................................. 508/507, 591
See application file for complete search history.

(56) References Cited

U.S. PATENT DOCUMENTS

| | | | |
|---|---|---|---|
| 4,116,917 | A | 9/1978 | Eckert |
| 5,458,791 | A | 10/1995 | Rhodes et al. |
| 5,460,736 | A | 10/1995 | Trinh et al. |
| 5,460,739 | A | 10/1995 | Rhodes et al. |
| 6,034,042 | A | 3/2000 | Rhodes |
| 7,163,913 | B2 | 1/2007 | Briggs et al. |

*Primary Examiner* — Prem C Singh
*Assistant Examiner* — Francis C Campanell

(57) ABSTRACT

Polymers suitable for use as a viscosity index improver for lubricating oil compositions including linear polymers characterized by the formula:

$$D'\text{-}PA\text{-}D'';$$

and star polymers characterized by the formula:

$$(D'\text{-}PA\text{-}D'')_n\text{-}X;$$

wherein D' represents an "outer" block derived from diene having a number average molecular weight of from about 10,000 to about 120,000 daltons; PA represents a block derived from monoalkenyl arene having a number average molecular weight of from about 10,000 to about 50,000 daltons; D" represents an inner random derived from diene having a number average molecular weight of from about 5,000 to about 60,000 daltons; n represents the average number of arms per star polymer formed by the reaction of 2 or more moles of a polyalkenyl coupling agent per mole of arms; and X represents a nucleus of a polyalkenyl coupling agent.

14 Claims, No Drawings

VISCOSITY INDEX IMPROVERS FOR LUBRICATING OIL COMPOSITIONS

FIELD OF THE INVENTION

The invention is directed to polymers suitable for use as viscosity index improvers for lubricating oil compositions including lubricating oil compositions for passenger car and heavy duty diesel engine as well as marine diesel engines and functional fluids, such as automatic transmission fluids, and to lubricating oil compositions and functional fluids containing such polymers. More specifically, the present invention is directed to certain linear triblock polymers having a specific architecture and star-polymers having multiple triblock arms having a specific architecture, coupled to a central core, which polymers have excellent shear stability and thickening efficiency and further provide lubricating oil compositions incorporating such polymers with fuel economy benefits.

BACKGROUND OF THE INVENTION

Lubricating oils for use in crankcase engine oils contain components that are used to improve the viscometric performance of the engine oil, i.e., to provide multigrade oils such as SAE 0W-XX, 5W-XX and 10W-XX multigrade oils, wherein XX is 20, 30 or 40. These viscosity performance enhancers, commonly referred to as viscosity index improvers (VII), or viscosity modifiers (VM) include olefin copolymers, polymethacrylates, styrene/hydrogenated diene block and star copolymers and hydrogenated isoprene star polymers.

Olefin copolymers (or OCP) that are used as viscosity index improvers conventionally comprise copolymers of ethylene, propylene and, optionally, a diene and provide a good thickening effect in oils at high temperature (thickening efficiency, or TE). Certain star polymers also provide excellent thickening efficiency and, due to their molecular architecture, are known to be more durable in use compared to OCPs; this durability being expressed in terms of a shear stability index number, or SSI. Star polymer-type VI improvers are commercially available and a great deal of research has been done to develop star polymers providing the optimal balance of shear stability, good solubility and finishability, thickening efficiency and cold temperature properties.

U.S. Pat. No. 4,116,917 exemplifies certain star polymers comprising hydrogenated poly(butadiene/isoprene) tapered arms containing about 44.3 wt. % polymer derived from butadiene. Since butadiene initially reacts faster than isoprene when anionic polymerization is initiated with secondary butyllithium (the process described in the patent), a polybutadiene block is first formed. As the butadiene concentration is lowered through polymerization, isoprene begins to add to the living polymer so that, when the polymerization reaction is complete, the chain is made up of a polybutadiene block, a tapered segment containing both butadiene and isoprene addition product, and a polyisoprene block resulting in a living tapered polymer chains that, when coupled with divinylbenzene, produce a star polymer having a polybutadiene block positioned distal from the divinylbenzene-coupled core. These star polymers were described as having excellent thickening efficiency and shear stability, but were found to have less than optimal cold temperature properties.

To provide an improvement in thickening efficiency, while maintaining low temperature performance, U.S. Pat. No. 5,460,739 suggests star polymers comprising triblock copolymer arms of hydrogenated polyisoprene/polybutadiene/polyisoprene. The hydrogenated polybutadiene block provides an increased ethylene content, which improves thickening efficiency. The patent suggests that, by placing the hydrogenated polybutadiene block more proximal to the nucleus, the adverse effect on low temperature properties could be minimized. Such polymers were found to provide improved low temperature properties relative to the tapered arm polymers of U.S. Pat. No. 4,116,917. However, when such polymers were provided with a hydrogenated polybutadiene block of a size sufficient to provide a credit in thickening efficiency, a debit in low temperature performance remained, relative to the pure polyisoprene polymers.

U.S. Pat. No. 5,458,791 discloses star polymer VI improvers having triblock copolymer arms having a polystyrene block positioned between two blocks of hydrogenated polyisoprene, wherein the hydrogenated polyisoprene block positioned proximal to the core of the star polymer is smaller than the hydrogenated polyisoprene block positioned distal from the core. These polymers were described as having excellent thickening efficiency and improved cold temperature properties.

U.S. Pat. No. 5,460,736 describes star polymers with triblock copolymer arms having a polybutadiene block positioned between polyisoprene blocks, which polymers were described as having excellent low temperature properties.

U.S. Pat. No. 6,034,042 discloses star polymers having tetrablock copolymer arms of hydrogenated polyisoprene-polybutadiene-polyisoprene together with polystyrene. These polymers were described as having improved finishability properties.

U.S. Pat. No. 7,163,913 describes star polymers having diblock arms including a block derived from monoalkenyl arene (e.g., styrene), and a block that is a hydrogenated random copolymer of isoprene and butadiene, wherein at least 70 wt. % of the butadiene is incorporated into the polymer in a 1,4-configuration and the weight ratio of isoprene addition product to butadiene addition product is from about 90:10 to about 70:30. Such polymers are described as having improved cold temperature properties compared to polymers having a block of pure polyisoprene.

Fuel economy (FE) has become a major driver in the global oil industry due to rising fuel prices and new emission regulations. There are many factors that influence fuel economy, from engine hardware design to individual components used in motor oils. With regard to viscosity index improving polymers, increasing the viscosity index of the polymer is one of the few factors that influence fuel economy. Viscosity index, or VI, is an empirical number that depends on the kinematic viscosity of a material, as measured at 40° C. and 100° C., and is calculated in accordance with ASTM D2270. A higher VI indicates a decreased change of viscosity with temperature and correlates with improved fuel economy performance; specifically, a higher VI viscosity index improver will have a lower kinematic viscosity at 40° C., which results in reduced frictional losses at low shear viscosities at 40° C., thereby contributing to improved fuel economy. For maximum fuel economy benefits, a viscosity index improver will provide a reduced viscosity contribution over a range of low and high shear regimes, and over the full range of operating temperatures.

It would, therefore, be advantageous to provide a polymer useful as a viscosity index improver, which polymer provides all the advantageous properties of previously known linear and star polymers; specifically shear stability, thickening efficiency, and cold temperature performance, which polymer further has an increased viscosity index and provides a fuel economy benefit.

SUMMARY OF THE INVENTION

In accordance with a first aspect of the invention, there is provided a class of polymers suitable for use as viscosity index improvers for lubricating oil compositions, which polymers comprise linear triblock polymers and/or star-polymers having multiple triblock arms coupled to a central core, such as a divinylbenzene (DVB) core, wherein the triblock polymers or triblock arms contain a block derived from monoalkenyl arene monomer positioned between two partially or fully hydrogenated blocks derived from diene, wherein at least one of the diene blocks is a copolymer derived from mixed diene monomer, in which from about 65 wt. % to about 95 wt. % of the incorporated monomer units are from isoprene and from about 5 wt. %, up to about 35 wt. % of the incorporated monomer units are from butadiene, and wherein at least about 80 wt. %, preferably at least about 90 wt. %, of butadiene is incorporated into the random copolymer block in a 1,4-configuration.

In accordance with a second aspect of the invention, there is provided a lubricating oil composition comprising a major amount of oil of lubricating viscosity, and a copolymer as in the first aspect, in an amount effective to improve the viscosity index of the lubricating oil composition.

In accordance with a third aspect of the invention, there is provided a lubricating oil composition and/or a functional fluid, such as an automatic transmission fluid, comprising a major amount of oil of lubricating viscosity, and a copolymer as in the first aspect, in an amount effective to improve the viscosity index of the lubricating oil composition and/or functional fluid.

In accordance with a fourth aspect of the invention, there is provided a method of improving the viscosity index of a lubricating oil composition or a functional fluid, comprising a major amount of oil of lubricating viscosity, which method comprises adding to said oil of lubricating viscosity an effective amount of a copolymer as in the first aspect.

In accordance with a fifth aspect of the invention, there is provided the use of a copolymer of the first aspect to improve the viscosity index of a lubricating oil composition or a functional fluid.

DETAILED DESCRIPTION OF THE INVENTION

Polymers of the present invention are linear polymers, which can be characterized by the formula:

$$D'\text{-}PA\text{-}D'';$$

and star polymers having multiple triblock arms coupled to a central core, which can be characterized by the formula:

$$(D'\text{-}PA\text{-}D'')_n\text{-}X;$$

wherein D' represents an "outer" block derived from diene; PA represents a block derived from monoalkenyl arene; D" represents an inner random derived from diene; n represents the average number of arms per star polymer formed by the reaction of 2 or more moles of a polyalkenyl coupling agent per mole of arms; and X represents a nucleus of a polyalkenyl coupling agent.

At least one of diene blocks D' and D", preferably each of diene blocks D' and D", are copolymer blocks derived from mixed diene monomer, in which from about 65 wt. % to about 95 wt. % of the incorporated monomer units are from isoprene and from about 5 wt. %, up to about 35 wt. % of the incorporated monomer units are from butadiene, and wherein at least about 80 wt. % of butadiene, preferably at least 90 wt. % of the butadiene is incorporated in a 1,4-configuration. Preferably, at least about 15 wt. % of the incorporated monomer units are butadiene monomer units. Preferably, no greater than about 28 wt. % of the incorporated monomer units are butadiene monomer units. Preferably, at least one of diene blocks D' and D", more preferably each of diene blocks D' and D", are random copolymer blocks. Blocks D' and D" are preferably hydrogenated to remove at least about 80% or 90% or 95% of unsaturations, and more preferably, are fully hydrogenated.

Outer block D' has a number average molecular weight of from about 10,000 to about 120,000 daltons, more preferably from about 20,000 to about 60,000 daltons, before hydrogenation. Block PA has a number average molecular weight of from about 10,000 to about 50,000 daltons. Increasing the size of block PA can adversely affect the thickening efficiency of the star polymer. Therefore, the number average molecular weight of block PA is preferably from about 12,000 to about 35,000 daltons. Inner block D" has a number average molecular weight of from about 5,000 to about 60,000 daltons, more preferably from about 10,000 to about 30,000 daltons, before hydrogenation. The term "number average molecular weight", as used herein, refers to the number average molecular weight as measured by Gel Permeation Chromatography ("GPC") with a polystyrene standard.

In addition to the size of blocks D', PA and D", the ratio between both the size of outer block D' and inner block D", and block PA and inner block D", has been found to influence the shear stability properties of the star polymer. In star polymers of the present invention, the ratio of the number average molecular weight of outer block D' to the number average molecular weight of inner block D" is preferably at least about 1.4:1, such as at least about 1.9:1, more preferably at least about 2.0:1, and the ratio of the number average molecular weight of block PA to the number average molecular weight of inner block D" is preferably at least about 0.75:1, such as at least about 0.9:1, more preferably at least about 1.0:1.

In addition to providing improved shear stability index (SSI) and thickening efficiency (TE), the star polymers of the present invention can provide improved viscometric properties in lubricating oil compositions and automatic transmission fluids, which result in fuel economy benefits. The star polymers of the present invention are more temperature responsive than prior star polymers, and begin to collapse at a temperatures of greater than 50° C., such as 100° C. or even 120° C. to reduce viscosity at the greatest range of temperatures at which significant thickening is unnecessary, while readily expanding at temperatures above 120° C. to provide sufficient viscosity to form thick oils films at engine operating temperatures, for good engine durability. Coil collapse with the star polymers of the present invention results in a reduced kinematic viscosity at 40° C., which improves viscosity index in a range of oil base stocks from Group I to Group IV. Increasing the initial coil collapse temperature (>50° C.) reduces the hydrodynamic volume below 100° C. and results in increased shear stability, without an adverse effect on thickening efficiency, thereby improving the TE/SSI balance. Increasing the initial coil collapse temperature to greater than 100° C. provides a star polymer having a reduced hydrodynamic volume over a range of operating temperatures from 20° C. to 90° C.

Preferably no greater than 30 wt. %, more preferably no greater than 25 wt. %, of the total amount of polydiene in the star polymers of the invention is derived from butadiene. Preferably, at least about 80 wt. %, more preferably, at least 90 wt. % of the total amount of butadiene, which can be incorporated into the polymer as 1,2-, or 1,4-configuration units, is incorporated into the star polymer is incorporated in a 1,4-configuration. Increasing the percentage of butadiene incorporated into the polymer as 1,4-units can increase the thickening efficiency properties of the star polymer. An excessive amount polybutadiene, particularly polybutadiene having a 1,2-configuration, can have an adverse effect on low temperature pumpability properties.

Isoprene monomers used as the precursors of the copolymers of the present invention can be incorporated into the polymer in either a 1,4- or 3,4-configuration, or as a mixture thereof. Preferably, the majority of the isoprene is incorporated into the polymer as 1,4-units, such as greater than about 60 wt. %, more preferably greater than about 80 wt. %, such as about 80 to 100 wt. %, most preferably greater than about 90 wt. %, such as about 93 wt. % to 100 wt. %.

Suitable monoalkenyl arene monomers include monovinyl aromatic compounds, such as styrene, monovinylnaphthalene, as well as the alkylated derivatives thereof, such as o-, m- and p-methylstyrene, alpha-methyl styrene and tertiary butylstyrene. The preferred monoalkenyl arene is styrene.

Linear polymers of the present invention may have a number average molecular weight of from about 25,000 daltons to about 1,000,000 daltons, such as from about 40,000 daltons to about 500,000 daltons, preferably from about 60,000 daltons to about 200,000 daltons.

Star polymers of the present invention can have from 4 to about 25 arms (n=about 4 to about 25), preferably from about 10 to about 20 arms. Star polymers of the present invention may have a total number average molecular weight of from about 100,000 daltons to about 1,000,000 daltons, preferably from about from about 400,000 to about 800,000 daltons, most preferably from about 500,000 to about 700,000 daltons.

The triblock linear polymers and triblock arms of the star polymers of the present invention can be formed as living polymers via anionic polymerization, in solution, in the presence of an anionic initiator, as described, for example, in U.S. Pat. No. Re 27,145 and U.S. Pat. No. 4,116,917. The preferred initiator is lithium or a monolithium hydrocarbon. Suitable lithium hydrocarbons include unsaturated compounds such as allyl lithium, methallyl lithium; aromatic compounds such as phenyllithium, the tolyllithiums, the xylyllithiums and the naphthyllithiums, and in particular, the alkyl lithiums such as methyllithium, ethyllithium, propyllithium, butyllithium, amyllithium, hexyllithium, 2-ethylhexyllithium and n-hexadecyllithium. Secondary-butyllithium is the preferred initiator. The initiator(s) may be added to the polymerization mixture in two or more stages, optionally together with additional monomer.

The triblock linear polymers and triblock arms of the star polymers of the present invention can, and are preferably, prepared by step-wise polymerization of the monomers e.g., polymerizing the random polyisoprene/polybutadiene copolymer, followed by the addition of the other monomer, specifically monoalkenyl arene monomer, followed by the polymerization of the second random polyisoprene/polybutadiene copolymer to form a living polymer having the formula polyisoprene/polybutadiene-polyalkenyl arene-polyisoprene/polybutadiene-X.

The living polyisoprene/polybutadiene copolymer blocks D' and/or D", in the absence of the proper control of the polymerization will, as described in U.S. Pat. No. 7,163,913, not be a random copolymer and will instead comprise a polybutadiene block, a tapered segment containing both butadiene and isoprene addition product, and a polyisoprene block. To prepare a random copolymer, the more reactive butadiene monomer may be added gradually to the polymerization reaction mixture containing the less reactive isoprene such that the molar ratio of the monomers in the polymerization mixture is maintained at the required level. It is also possible to achieve the required randomization by gradually adding a mixture of the monomers to be copolymerized to the polymerization mixture. Living random copolymers may also be prepared by carrying out the polymerization in the presence of a so-called randomizer. Randomizers are polar compounds that do not deactivate the catalyst and randomize the manner in which the monomers are incorporated into to the polymer chain. Suitable randomizers are tertiary amines, such as trimethylamine, triethylamine, dimethylamine, tri-n-propylamine, tri-n-butylamine, dimethylaniline, pyridine, quinoline, N-ethyl-piperidine, N-methylmorpholine; thioethers, such as dimethyl sulfide, diethyl sulfide, di-n-propyl sulfide, di-n-butyl sulfide, methyl ethyl sulfide; and in particular, ethers such as dimethyl ether, methyl ether, diethyl ether, di-n-propyl ether, di-n-butyl ether, di-octyl ether, dibenzyl ether, di-phenyl ether, anisole, 1,2-dimethyloxyethane, o-dimethyloxy benzene, and cyclic ethers, such as tetrahydrofuran.

Even with controlled monomer addition and/or the use of a randomizer, the initial and terminal portions of the polymer chains may have greater than a "random" amount of polymer derived from the more reactive and less reactive monomer, respectively. Therefore, for the purpose of this invention, the term "random copolymer" means a polymer chain, or a polymer block, the preponderance of which (greater than 80%, preferably greater than 90%, such as greater than 95%) results from the random addition of comonomer materials.

The solvents in which the living polymers are formed are inert liquid solvents, such as hydrocarbons e.g., aliphatic hydrocarbons such as pentane, hexane, heptane, oxtane, 2-ethylhexane, nonane, decane, cyclohexane, methylcyclohexane, or aromatic hydrocarbons e.g., benzene, toluene, ethylbenzene, the xylenes, diethylbenzenes, propylbenzenes. Cyclohexane is preferred. Mixtures of hydrocarbons e.g., lubricating oils, may also be used.

The temperature at which the polymerization is conducted may be varied within a wide range, such as from about −50° C. to about 150° C., preferably from about 20° C. to about 80° C. The reaction is suitably carried out in an inert atmosphere, such as nitrogen, and may optionally be carried out under pressure e.g., a pressure of from about 0.5 to about 10 bars.

The concentration of the initiator used to prepare the living polymer may also vary within a wide range and is determined by the desired molecular weight of the living polymer.

To provide a star polymer, the living polymers formed via the foregoing process may be reacted in an additional reaction step, with a polyalkenyl coupling agent. Polyalkenyl coupling agents capable of forming star polymers have been known for a number of years and are described, for example, in U.S. Pat. No. 3,985,830. Polyalkenyl coupling agents are conventionally compounds having at least two non-conjugated alkenyl groups. Such groups are usually attached to the same or different electron-withdrawing moiety e.g. an aromatic nucleus. Such compounds have alkenyl groups that are capable of independent reaction with different living polymers and in this respect are different from conventional conjugated diene polymerizable monomers such as butadiene, isoprene, etc. Pure or technical grade polyalkenyl coupling agents may be used. Such compounds may be aliphatic, aromatic or heterocyclic. Examples of aliphatic compounds include the polyvinyl and polyallyl acetylene, diacetylenes, phosphates and phosphates as well as dimethacrylates, e.g. ethylene dimethylacrylate. Examples of suitable heterocyclic compounds include divinyl pyridine and divinyl thiophene.

The preferred coupling agents are the polyalkenyl aromatic compounds and most preferred are the polyvinyl aromatic compounds. Examples of such compounds include those aromatic compounds, e.g. benzene, toluene, xylene, anthracene, naphthalene and durene, which are substituted with at least two alkenyl groups, preferably attached directly thereto. Specific examples include the polyvinyl benzenes e.g. divinyl, trivinyl and tetravinyl benzenes; divinyl, trivinyl and tetravinyl ortho-, meta- and para-xylenes, divinyl naphthalene, divinyl ethyl benzene, divinyl biphenyl, diisobutenyl benzene, diisopropenyl benzene, and diisopropenyl biphenyl. The preferred aromatic compounds are those represented by the formula $A\text{-}(CH{=}CH_2)_x$ wherein A is an optionally substituted aromatic nucleus and x is an integer of at least 2. Divinyl benzene, in particular meta-divinyl benzene, is the most preferred aromatic compound. Pure or technical grade divinyl benzene (containing other monomers e.g. styrene and ethyl styrene) may be used. The coupling agents may be used in admixture with small amounts of added monomers which increase the size of the nucleus, e.g. styrene or alkyl styrene. In such a case, the nucleus can be described as a poly(dialkenyl coupling agent/monoalkenyl aromatic compound) nucleus, e.g. a poly(divinylbenzene/monoalkenyl aromatic compound) nucleus.

The polyalkenyl coupling agent should be added to the living polymer after the polymerization of the monomers is substantially complete, i.e. the agent should be added only after substantially all the monomer has been converted to the living polymers.

The amount of polyalkenyl coupling agent added may vary within a wide range, but preferably, at least 0.5 mole of the coupling agent is used per mole of unsaturated living polymer. Amounts of from about 1 to about 15 moles, preferably from about 1.5 to about 5 moles per mole of living polymer are preferred. The amount, which can be added in two or more stages, is usually an amount sufficient to convert at least about 80 wt. % to 85 wt. % of the living polymer into star-shaped polymer.

The coupling reaction can be carried out in the same solvent as the living polymerization reaction. The coupling reaction can be carried out at temperatures within a broad range, such as from 0° C. to 150° C., preferably from about 20° C. to about 120° C. The reaction may be conducted in an inert atmosphere, e.g. nitrogen, and under pressure of from about 0.5 bar to about 10 bars.

The resulting linear or star-shaped copolymers can then be hydrogenated using any suitable means. A hydrogenation catalyst may be used e.g. a copper or molybdenum compound. Catalysts containing noble metals, or noble metal-containing compounds, can also be used. Preferred hydrogenation catalysts contain a non-noble metal or a non-noble metal-containing compound of Group VIII of the periodic Table i.e., iron, cobalt, and particularly, nickel. Specific examples of preferred hydrogenation catalysts include Raney nickel and nickel on kieselguhr. Particularly suitable hydrogenation catalysts are those obtained by causing metal hydrocarbyl compounds to react with organic compounds of any one of the group VIII metals iron, cobalt or nickel, the latter compounds containing at least one organic compound that is attached to the metal atom via an oxygen atom as described, for example, in U.K. Pat. No. 1,030,306. Preference is given to hydrogenation catalysts obtained by causing an aluminum trialkyl (e.g. aluminum triethyl ($Al(Et_3)$) or aluminum triisobutyl) to react with a nickel salt of an organic acid (e.g. nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel enolates or phenolates (e.g., nickel acetonylacetonate, the nickel salt of butylacetophenone). Suitable hydrogenation catalysts will be well known to those skilled in the art and the foregoing list is by no means intended to be exhaustive.

The hydrogenation of the polymers of the present invention is suitably conducted in solution, in a solvent which is inert during the hydrogenation reaction. Saturated hydrocarbons and mixtures of saturated hydrocarbons are suitable. Advantageously, the hydrogenation solvent is the same as the solvent in which polymerization is conducted. Suitably, at least 50%, preferably at least 70%, more preferably at least 90%, most preferably at least 95% of the original olefinic unsaturation is hydrogenated.

Alternatively, the linear and star polymers of the present invention can be selectively hydrogenated such that the olefin saturations are hydrogenated as above, while the aromatic unsaturations are hydrogenated to a lesser extent. Preferably, less than 10%, more preferably less than 5% of the aromatic unsaturations are hydrogenated.

Selective hydrogenation techniques are also well known to those of ordinary skill in the art and are described, for example, in U.S. Pat. No. 3,595,942, U.S. Pat. No. Re 27,145, and U.S. Pat. No. 5,166,277.

The polymer may then be recovered in solid form from the solvent in which it is hydrogenated by any convenient means, such as by evaporating the solvent. Alternatively, oil e.g. lubricating oil, may be added to the solution, and the solvent stripped off from the mixture so formed to provide a concentrate. Suitable concentrates contain from about 3 wt. % to about 25 wt. %, preferably from about 5 wt. % to about 15 wt. % of the star polymer.

The linear and star polymers of the present invention are used principally in the formulation of crankcase lubricating oils for passenger car and heavy duty diesel engines, and in the formulation of automatic transmission fluids and comprise a major amount of an oil of lubricating viscosity, a VI improver as described above, in an amount effective to modify the viscosity index of the lubricating oil, and optionally other additives as needed to provide the lubricating oil/automatic transmission fluid composition with the required properties. Lubricating oil and automatic transmission fluid compositions may contain the linear and/or star polymer VI improver of the present invention in an amount of from about 0.1 wt. % to about 2.5 wt. %, preferably from about 0.3 wt. % to about 1.5 wt. %, more preferably from about 0.4 wt. % to about 1.3 wt. %, stated as mass percent active ingredient (AI) in the fully formulated lubricating oil/automatic transmission fluid composition. The viscosity index improver of the invention may comprise the sole VI improver, or may be used in combination with other VI improvers, for example, in combination with an VI improver comprising polyisobutylene, copolymers of ethylene and propylene (OCP), polymethacrylates, methacrylate copolymers, copolymers of an unsaturated dicarboxylic acid and a vinyl compound, interpolymers of styrene and acrylic esters, and hydrogenated copolymers of styrene/isoprene, styrene/butadiene, and other hydrogenated isoprene/butadiene copolymers, as well as the partially hydrogenated homopolymers of butadiene and isoprene.

Oils of lubricating viscosity useful in the context of the present invention may be selected from natural lubricating oils, synthetic lubricating oils and mixtures thereof. The lubricating oil may range in viscosity from light distillate mineral oils to heavy lubricating oils such as gasoline engine oils, mineral lubricating oils and heavy duty diesel oils. Generally, the viscosity of the oil ranges from about 2 centistokes to about 40 centistokes, especially from about 4 centistokes to about 20 centistokes, as measured at 100° C.

Natural oils include animal oils and vegetable oils (e.g., castor oil, lard oil); liquid petroleum oils and hydrorefined, solvent-treated or acid-treated mineral oils of the paraffinic, naphthenic and mixed paraffinic-naphthenic types. Oils of lubricating viscosity derived from coal or shale also serve as useful base oils.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, and the alkyl and aryl ethers of polyoxyalkylene polymers (e.g., methyl-polyiso-propylene glycol ether having a molecular weight of 1000 or diphenyl ether of poly-ethylene glycol having a molecular weight of 1000 to 1500); and mono- and polycarboxylic esters thereof, for example, the acetic acid esters, mixed $C_3$-$C_8$ fatty acid esters and $C_{13}$ oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of such esters includes dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy- or polyaryloxysilicone oils and silicate oils comprise another useful class of synthetic lubricants; such oils include tetraethyl silicate, tetraisopropyl silicate, tetra-(2-ethylhexyl) silicate, tetra-(4-methyl-2-ethylhexyl)silicate, tetra-(p-tert-butyl-phenyl) silicate, hexa-(4-methyl-2-ethylhexyl)disiloxane, poly(methyl)siloxanes and poly(methylphenyl) siloxanes. Other synthetic lubricating oils include liquid esters of phosphorous-containing acids (e.g., tricresyl phosphate, trioctyl phosphate, diethyl ester of decylphosphonic acid) and polymeric tetrahydrofurans.

Ashless dispersants maintain in suspension oil insolubles resulting from oxidation of the oil during wear or combustion. They are particularly advantageous for preventing the precipitation of sludge and the formation of varnish, particularly in gasoline engines.

Metal-containing or ash-forming detergents function both as detergents to reduce or remove deposits and as acid neutralizers or rust inhibitors, thereby reducing wear and corrosion and extending engine life. Detergents generally comprise a polar head with a long hydrophobic tail, with the polar head comprising a metal salt of an acidic organic compound. The salts may contain a substantially stoichiometric amount of the metal in which case they are usually described as normal or neutral salts, and would typically have a total base number or TBN (as can be measured by ASTM D2896) of from 0 to 80. A large amount of a metal base may be incorporated by reacting excess metal compound (e.g., an oxide or hydroxide) with an acidic gas (e.g., carbon dioxide). The resulting overbased detergent comprises neutralized detergent as the outer layer of a metal base (e.g. carbonate) micelle. Such overbased detergents may have a TBN of 150 or greater, and typically will have a TBN of from 250 to 450 or more.

Dihydrocarbyl dithiophosphate metal salts are frequently used as antiwear and antioxidant agents. The metal may be an alkali or alkaline earth metal, or aluminum, lead, tin, molybdenum, manganese, nickel or copper. The zinc salts are most commonly used in lubricating oil and may be prepared in accordance with known techniques by first forming a dihydrocarbyl dithiophosphoric acid (DDPA), usually by reaction of one or more alcohol or a phenol with $P_2S_5$ and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides and carbonates are most generally employed. Commercial additives frequently contain an excess of zinc due to the use of an excess of the basic zinc compound in the neutralization reaction.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons, phosphorous esters, metal thiocarbamates, oil soluble copper compounds as described in U.S. Pat. No. 4,867,890, and molybdenum-containing compounds and aromatic amines.

Known friction modifiers include oil-soluble organo-molybdenum compounds. Such organo-molybdenum friction modifiers also provide antioxidant and antiwear credits to a lubricating oil composition. As an example of such oil soluble organo-molybdenum compounds, there may be mentioned the dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alkylthioxanthates.

Other known friction modifying materials include glyceryl monoesters of higher fatty acids, for example, glyceryl monooleate; esters of long chain polycarboxylic acids with diols, for example, the butane diol ester of a dimerized unsaturated fatty acid; oxazoline compounds; and alkoxylated alkyl-substituted mono-amines, diamines and alkyl ether amines, for example, ethoxylated tallow amine and ethoxylated tallow ether amine.

Pour point depressants, otherwise known as lube oil flow improvers (LOFI), lower the minimum temperature at which the fluid will flow or can be poured. Such additives are well known. Typical of those additives that improve the low temperature fluidity of the fluid are $C_8$ to $C_{18}$ dialkyl fumarate/vinyl acetate copolymers, and polymethacrylates.

Foam control can be provided by an antifoamant of the polysiloxane type, for example, silicone oil or polydimethyl siloxane.

Some of the above-mentioned additives can provide a multiplicity of effects; thus for example, a single additive may act as a dispersant-oxidation inhibitor. This approach is well known and need not be further elaborated herein.

It may also be necessary to include an additive which maintains the stability of the viscosity of the blend. Thus, although polar group-containing additives achieve a suitably low viscosity in the pre-blending stage it has been observed that some compositions increase in viscosity when stored for prolonged periods. Additives which are effective in controlling this viscosity increase include the long chain hydrocarbons functionalized by reaction with mono- or dicarboxylic acids or anhydrides which are used in the preparation of the ashless dispersants as hereinbefore disclosed.

Representative effective amounts of such additional additives, when used in crankcase lubricants, are listed below:

| ADDITIVE | Mass % (Broad) | Mass % (Preferred) |
| --- | --- | --- |
| Ashless Dispersant | 0.1-20 | 1-8 |
| Metal Detergents | 0.1-15 | 0.2-9 |
| Corrosion Inhibitor | 0-5 | 0-1.5 |
| Metal Dihydrocarbyl Dithiophosphate | 0.1-6 | 0.1-4 |
| Antioxidant | 0-5 | 0.01-2 |
| Pour Point Depressant | 0.01-5 | 0.01-1.5 |
| Antifoaming Agent | 0-5 | 0.001-0.15 |
| Supplemental Antiwear Agents | 0-1.0 | 0-0.5 |
| Friction Modifier | 0-5 | 0-1.5 |
| Basestock | Balance | Balance |

It may be desirable, although not essential to prepare one or more additive concentrates comprising additives (concentrates sometimes being referred to as additive packages) whereby several additives can be added simultaneously to the oil to form the lubricating oil composition. The final lubricant composition may employ from 5 to 25 mass %, preferably 5 to 18 mass %, typically 10 to 15 mass % of the concentrate, the remainder being oil of lubricating viscosity.

This invention will be further understood by reference to the following examples. In the following Examples, the properties of certain VI improvers are described using certain terms of art, which are defined below. In the Examples, all parts are parts by weight, unless otherwise noted.

"Shear Stability Index (SSI)" measures the ability of polymers used as V.I. improvers in crankcase lubricants to maintain thickening power during SSI is indicative of the resistance of a polymer to degradation under service conditions. The higher the SSI, the less stable the polymer, i.e., the more susceptible it is to degradation. SSI is defined as the percentage of polymer-derived viscosity loss and is calculated as follows:

$$SSI = 100 \times \frac{kv_{fresh} - kv_{after}}{kv_{fresh} - kv_{oil}}$$

wherein $kv_{fresh}$ is the kinematic viscosity of the polymer-containing solution before degradation and $kv_{after}$ is the kinematic viscosity of the polymer-containing solution after degradation. SSI is conventionally determined using ASTM D6278-98 (known as the Kurt-Orban (KO) or DIN bench test). The polymer under test is dissolved in suitable base oil (for example, solvent extracted 150 neutral) to a relative viscosity of 2 to 3 centistokes at 100° C. and the resulting fluid is pumped through the testing apparatus specified in the ASTM D6278-98 protocol.

"Thickening Efficiency (TE)" is representative of a polymers ability to thicken oil per unit mass and is defined as:

$$TE = \frac{2}{c\ln 2}\ln\left(\frac{kv_{oil+polymer}}{kv_{oil}}\right)$$

wherein c is polymer concentration (grams of polymer/100 grams solution), $kv_{oil+polymer}$ is kinematic viscosity of the polymer in the reference oil, and $kv_{oil}$ is kinematic viscosity of the reference oil.

"Cold Cranking Simulator (CCS)" is a measure of the cold-cranking characteristics of crankcase lubricants and is conventionally determined using a technique described in ASTM D5293-92.

"Scanning Brookfield" is used to measure the apparent viscosity of engine oils at low temperatures. A shear rate of approximately $0.2\ s^{-1}$ is produced at shear stresses below 100 Pa. Apparent viscosity is measured continuously as the sample is cooled at a rate of 1° C./h over the range of −5° C. to −40° C., or to the temperature at which the viscosity exceeds 40,000 mPa·s (cP). The test procedure is defined in ASTM D5133-01. The measurements resulting from the test method are reported as viscosity in mPa·s or the equivalent cP, the maximum rate of viscosity increase (Gelation Index) and the temperature at which the Gelation Index occurs.

"Mini Rotary Viscometer (MRV)-TP-1" measures yield stress and viscosity of engine oils after cooling at controlled rates over a period of 45 hours to a final test temperature between −15° C. and −40° C. The temperature cycle is defined in SAE Paper No. 850443, K. O. Henderson et al. Yield stress (YS) is measured first at the test temperature and apparent viscosity is then measured at a shear stress of 525 Pa over a shear rate of 0.4 to $15^{s-1}$. Apparent viscosity is reported in mPa·s, or the equivalent cP.

"Pour point" measures the ability of an oil composition to flow as the temperature is lowered. Performance is reported in degrees centigrade and is measured using the test procedure described in ASTM D97-02. After preliminary heating, the sample is cooled at a specified rate and examined at intervals of 3° C. for flow characteristics. The lowest temperature at which movement of the specimen is observed is reported as the pour point. Each of MRV-TP-1, CCS and pour point is indicative of the low temperature viscomentric properties of oil compositions.

"Crystallinity" in ethylene-alpha-olefin polymers can be measured using X-ray techniques known in the art as well as by the use of a differential scanning calorimetry (DSC) test. DSC can be used to measure crystallinity as follows: a polymer sample is annealed at room temperature (e.g., 20-25° C.) for at least 24 hours before the measurement. Thereafter, the sample is first cooled to −100° C. from room temperature, and then heated to 150 C at 10° C./min. Crystallinity is calculated as follows:

$$\% \text{ Crystallinity} = \left(\sum \Delta H\right) \times x_{methylene} \times \frac{14}{4110} \times 100\%,$$

wherein $\Sigma\Delta H$ (J/g) is the sum of the heat absorbed by the polymer above its glass transition temperature, $x_{methylene}$ is the molar fraction of ethylene in the polymer calculated, e.g., from proton NMR data, 14 (g/mol) is the molar mass of a methylene unit, and 4110 (J/mol) is the heat of fusion for a single crystal of polyethylene at equilibrium.

"Coil collapse temperature" can be measured by plotting relative viscosity vs. temperature, wherein "relative viscosity" is the ratio of the kinematic viscosity of a 1 mass % polymer in solvent at 100° C. to the kinematic viscosity of the solvent at 100° C. The CCT is the temperature at which the relative viscosity is highest.

This invention will be further understood by reference to the following (non-limiting) examples.

EXAMPLES

A series of star polymers were prepared having compositions as presented in Table 1. Each of the star polymers had on average about 12.5 arms per star molecule.

TABLE 2

| Example | CCT (° C.) | TE | SSI | TE/SSI |
|---------|------------|------|-------|--------|
| 1B | 40 | 2.46 | 15.31 | 0.16 |
| 2B | 120 | 2.44 | 8.40 | 0.29 |
| 3B | 100 | 2.74 | 20.60 | 0.13 |
| 4B | 120 | 1.89 | 0.93 | 2.03 |
| 5B | 120 | 2.34 | 5.00 | 0.47 |
| 6B | 60 | 2.31 | 20.25 | 0.11 |
| 7B | 40 | 2.43 | 10.95 | 0.22 |
| 8B | 120 | 2.32 | 4.13 | 0.56 |
| 9B | 120 | 2.35 | 6.38 | 0.37 |

A comparison between Example 1B and Example 7B demonstrates that the presence of butadiene in at least one of blocks D' and D" effects the SSI of the resulting block polymer. Example 7B (comparative) and Examples 2B, 4B, 8B and 9B (inventive) all have similar ratios between the size of blocks D' and D", and similar butadiene contents, but different PA contents, and a comparison between these examples demonstrates the effect of the size of the PA block on both CCT and SSI. A comparison between Example 3B (non-preferred inventive) and Examples 2B, 4B, 8B and 9B (inventive) demonstrates the effect the ratio between the size of block PA and D" has on SSI, although Example 3B does provide a fuel economy credit (see Table 3). Example 6 (comparative) and Examples 8B and 9B had similar butadiene and polystyrene contents, but a different ratio between the size of blocks D' and D" and a comparison between these examples demonstrates the effect of the ratio between the size of D' and D" on both CCT and SSI.

TABLE 1

| Example | Description | D' (Da) | D" (Da) | PA (Da) | D'/D" | PA/D" | % BD In Arm | True Total Arm Mol. Wt. (Da) | PA Content (%) |
|---------|-------------|---------|---------|---------|-------|-------|-------------|------------------------------|-----------------|
| 1A (Comp.) | EP-S-EP Triblock No Butadiene BD | 32620 | 15728 | 7500 | 2.0 | 0.5 | 0.00 | 55848 | 13.43 |
| 2A (Inv.) | EP-S-EP Triblock with 22 wt. % EB in D' | 34627 | 18314 | 18886 | 1.9 | 1.02 | 10.39 | 71827 | 26.29 |
| 3A (Inv.) | EP-S-EP Triblock with 22 wt. % EB in D' | 39637 | 19833 | 14867 | 1.8 | 0.78 | 11.02 | 74337 | 20.00 |
| 4A (Inv.) | EP-S-EP Triblock with 22 wt. % EB in D' | 27620 | 12605 | 20560 | 2.2 | 1.63 | 9.77 | 60785 | 33.82 |
| 5A (Inv.) | EP-S-EP Triblock with 22 wt. % EB in D' | 33118 | 13538 | 15562 | 2.4 | 1.15 | 11.88 | 62218 | 25.01 |
| 6A (Comp.) | EP-S-EP Triblock with 22 wt. % EB in D' | 26435 | 24838 | 16972 | 1.1 | 0.68 | 8.75 | 68245 | 24.87 |
| 7A (Comp.) | EP-S-EP Triblock with 22 wt. % EB in D' | 33410 | 15530 | 7730 | 2.2 | 0.50 | 10.90 | 56670 | 13.64 |
| 8A (Inv.) | EP-SE-P Triblock with 15 wt. % EB in D" | 35710 | 16400 | 16700 | 2.2 | 1.02 | 9.64 | 68810 | 24.27 |
| 9A (Inv.) | EP-S-EP Triblock with 15 wt. % EB in D" | 35400 | 15590 | 15460 | 2.3 | 0.99 | 9.99 | 66450 | 23.27 |

In Table 1, "EP" indicates ethylene/propylene units derived from polymerization of hydrogenated isoprene; "EB" indicates ethylene/butene units derived from polymerization of hydrogenated butadiene ("BD"); and "S" indicates units derived from styrene. Polymer Examples 2A, 4A, 5A, 8A and 9A represent the present invention.

For each of the star polymers of Table 1, the coil collapse temperature (CCT), (in Group III base stocks), thickening efficiency (TE) and 30 cycle shear stability index (SSI) were determined. TE was determined using 1 mass % polymer in STS ENJ-403 diluent oil. The results are shown below in Table 2:

Lubricating oil compositions were then blended using a Group III base stock, and a commercial detergent/inhibitor package designed for maximum fuel economy performance (Infineum P6003, available from Infineum USA L.P. and Infineum UK, Ltd., at a treat rate (TR) of 12.3 mass %) and amounts of the polymers of Examples 1A through 9A providing a 5W-30 grade lubricating oil composition having a high temperature high shear viscosity at 150° C. ($HTHS_{150}$) of 3.5 cP. Fuel economy was measured on a chassis dynamometer running on a New European Drive Cycle (NEDC relative to a reference oil CEC RL191/12 (15W-40 oil).

The results are shown in Table 3.

TABLE 3

| Example | Fuel Economy vs. Reference Oil (%) |
| --- | --- |
| 1C | 0.97 |
| 2C | 1.95 |
| 3C | 1.78 |
| 4C | 1.92 |
| 5C | 2.09 |
| 6C | Sample gelled |
| 7C | 0.97 (estimated) |
| 8C | 2.10 |
| 9C | 2.27 |

As shown, maximum fuel economy performance is provided by the star polymers of the present invention.

The disclosures of all patents, articles and other materials described herein are hereby incorporated, in their entirety, into this specification by reference. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention. Further, when used to describe combinations of components (e.g., VI improver, additives and oil) the term "comprising" should be construed to include the composition resulting from admixing of the noted components.

What is claimed is:

1. Polymers suitable for use as a viscosity index improver for lubricating oil compositions comprising linear polymers characterized by the formula:

D'-PA-D";

and star polymers characterized by the formula:

$(D'-PA-D'')_n$-X;

wherein D' represents a block derived from at least one diene selected from isoprene and butadiene; PA represents a block derived from styrene; D" represents a block derived from at least one diene selected from isoprene and butadiene; n is 10 to 20 and represents the average number of arms per star polymer; and X represents a nucleus of a polyalkenyl coupling agent;

wherein at least one of diene blocks D' and D" is a copolymer block derived from mixed diene monomer, in which from about 72 wt. % to about 85 wt. % of the incorporated monomer units are from isoprene and from about 15 wt. %, up to about 28 wt. % of the incorporated monomer units are from butadiene, and wherein at least about 80 wt. % of the butadiene is incorporated in a 1,4-configuration; and wherein D' has a number average molecular weight of from about 20,000 to about 60,000 daltons; PA has a number average molecular weight of from about 10,000 to about 35,000 daltons; and D" has a number average molecular weight of from about 5,000 to about 30,000 daltons.

2. Polymers, as claimed in claim 1, wherein the ratio between the number average molecular weight of D' and the number average molecular weight of D" is at least about 1.4:1.

3. Polymers, as claimed in claim 2, wherein the ratio between the number average molecular weight of D' and the number average molecular weight of D" is at least about 1.9:1.

4. Polymers, as claimed in claim 3, wherein the ratio between the number average molecular weight of D' and the number average molecular weight of D" is at least about 2.0:1.

5. Polymers, as claimed in claim 1, wherein the ratio between the number average molecular weight of PA and the number average molecular weight of D" is at least about 0.75:1.

6. Polymers, as claimed in claim 5, wherein the ratio between the number average molecular weight of PA and the number average molecular weight of D" is at least about 0.9:1.

7. Polymers, as claimed in claim 6, wherein the ratio between the number average molecular weight of PA and the number average molecular weight of D" is at least about 1.0:1.

8. Polymers, as claimed in claim 2, wherein the ratio between the number average molecular weight of PA and the number average molecular weight of D" is at least about 0.75:1.

9. Polymers, as claimed in claim 8, wherein the ratio between the number average molecular weight of PA and the number average molecular weight of D" is at least about 0.9:1.

10. Polymers, as claimed in claim 9, wherein the ratio between the number average molecular weight of PA and the number average molecular weight of D" is at least about 1.0:1.

11. Star polymers, as claimed in claim 1, having a total number average molecular weight of from about 100,000 daltons to about 1,000,000 daltons.

12. Linear polymers, as claimed in claim 1, having a total number average molecular weight of from about 40,000 daltons to about 1,000,000 daltons.

13. A lubricating oil composition comprising a major amount of oil of lubricating viscosity, and polymer of claim 1, in an amount effective to modify the viscosity index of the lubricating oil composition.

14. A method of modifying the viscosity index of a lubricating oil composition comprising a major amount of oil of lubricating viscosity, which method comprises adding to said oil of lubricating viscosity an effective amount of polymer of claim 1.

* * * * *